US009845911B2

(12) United States Patent
Sagnard et al.

(10) Patent No.: US 9,845,911 B2
(45) Date of Patent: Dec. 19, 2017

(54) THERMOPLASTIC POLYMERIC FOAM PIPE INSULATION

(71) Applicant: Dow Global Technologies LLC, Midland, MI (US)

(72) Inventors: Alain Sagnard, Lachen (CH); Lars Massueger, Zurich (CH); Jean-Francois Koenig, Horgen (CH); Ralph Schmidt, Ettlingen (DE)

(73) Assignee: Dow Global Technologies LLC, Midland, MI (US)

( * ) Notice: Subject to any disclaimer, the term of this patent is extended or adjusted under 35 U.S.C. 154(b) by 288 days.

(21) Appl. No.: 14/655,820

(22) PCT Filed: Feb. 17, 2014

(86) PCT No.: PCT/US2014/016677
§ 371 (c)(1),
(2) Date: Jun. 26, 2015

(87) PCT Pub. No.: WO2014/133803
PCT Pub. Date: Sep. 4, 2014

(65) Prior Publication Data
US 2015/0345691 A1 Dec. 3, 2015

Related U.S. Application Data

(60) Provisional application No. 61/769,346, filed on Feb. 26, 2013.

(51) Int. Cl.
*F16L 59/14* (2006.01)
*F16L 59/02* (2006.01)
(Continued)

(52) U.S. Cl.
CPC .......... *F16L 59/145* (2013.01); *C08J 9/0019* (2013.01); *C08J 9/127* (2013.01); *C08J 9/149* (2013.01);
(Continued)

(58) Field of Classification Search
CPC ....... F16L 59/02; F16L 59/021; F16L 59/024; F16L 59/025; F16L 59/027; F16L 59/12;
(Continued)

(56) References Cited

U.S. PATENT DOCUMENTS 3,489,183 A    1/1970  Eberle et al.
3,932,727 A *  1/1976  True ...................... F16L 53/008
                                                          137/297

(Continued)

FOREIGN PATENT DOCUMENTS

DE    29819020      3/1999
JP    2007032871    2/2007
WO    2012082332    6/2012

OTHER PUBLICATIONS

Search Report corresponding to Japanese application No. 2015-558898 dated Oct. 6, 2016.
(Continued)

*Primary Examiner* — Walter B Aughenbaugh
(74) *Attorney, Agent, or Firm* — Steven W. Mork

(57) ABSTRACT

An article with at least two extruded thermoplastic polymer foam pieces that fit together to form a length of foam having a generally annular cross section, each piece having a concave surface such that the concave surfaces adjoin to form an internal edge defining a hole within the generally annular cross section; wherein each piece has a density less than 36 kilograms per cubic meter, a product of density times average cell size that is less than 17
(Continued)

millimeters*kilogram per cubic meter, and a thermal conductivity of 35 milliwatts per meter*Kelvin or less.

14 Claims, 2 Drawing Sheets

(51) Int. Cl.
| | |
|---|---|
| *F16L 59/12* | (2006.01) |
| *F16L 59/16* | (2006.01) |
| *F16L 59/15* | (2006.01) |
| *F16L 59/153* | (2006.01) |
| *C08J 9/00* | (2006.01) |
| *C08J 9/12* | (2006.01) |
| *C08J 9/14* | (2006.01) |

(52) U.S. Cl.
CPC ............ *F16L 59/02* (2013.01); *F16L 59/021* (2013.01); *F16L 59/024* (2013.01); *F16L 59/025* (2013.01); *F16L 59/027* (2013.01); *F16L 59/12* (2013.01); *F16L 59/14* (2013.01); *F16L 59/141* (2013.01); *F16L 59/143* (2013.01); *F16L 59/15* (2013.01); *F16L 59/153* (2013.01); *F16L 59/16* (2013.01); *C08J 2201/03* (2013.01); *C08J 2203/202* (2013.01); *C08J 2207/00* (2013.01); *C08J 2325/06* (2013.01); *C08J 2325/12* (2013.01); *Y10T 29/49828* (2015.01); *Y10T 428/1376* (2015.01)

(58) Field of Classification Search
CPC ....... F16L 59/14; F16L 59/141; F16L 59/143; F16L 59/15; F16L 59/153; F16L 59/16; F16L 59/145; B32B 1/08
See application file for complete search history.

(56) References Cited

U.S. PATENT DOCUMENTS

| | | | |
|---|---|---|---|
| 4,162,093 A | | 7/1979 | Sigmund |
| 4,287,245 A | * | 9/1981 | Kikuchi ................ F16L 59/024 138/141 |
| 4,878,520 A | | 11/1989 | Nakamura et al. |
| 4,981,879 A | * | 1/1991 | Snider ..................... C08J 9/148 428/308.4 |
| 8,173,714 B2 | | 5/2012 | Datko et al. |
| 2013/0018117 A1 | | 1/2013 | Fox et al. |
| 2015/0140243 A1 | | 5/2015 | Sagnard et al. |

OTHER PUBLICATIONS

Office Action from corresponding Chinese 201480006910.9 application, dated Mar. 10, 2017.
Search Report corresponding to European application No. 14711624.8 dated Jul. 5, 2017.
The Dow Chemical Company, Styrofoam Extruded Polystyrene Pipe Insulation; Insulation Solutions; Form No. 179-08040X-0606P Product Information, pp. 1 & 2.

* cited by examiner

FIGURE 1
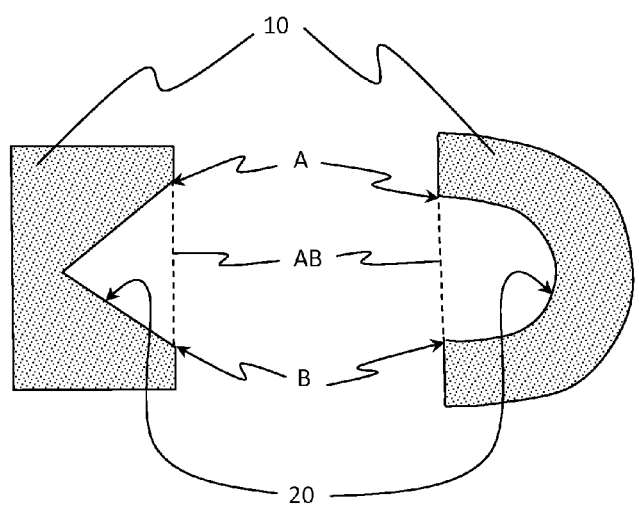
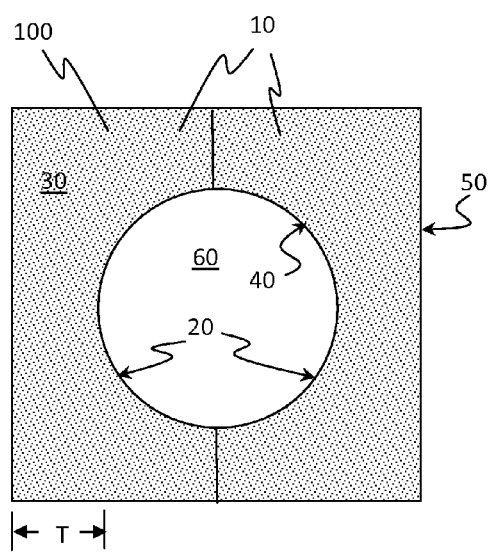
FIGURE 2(a)
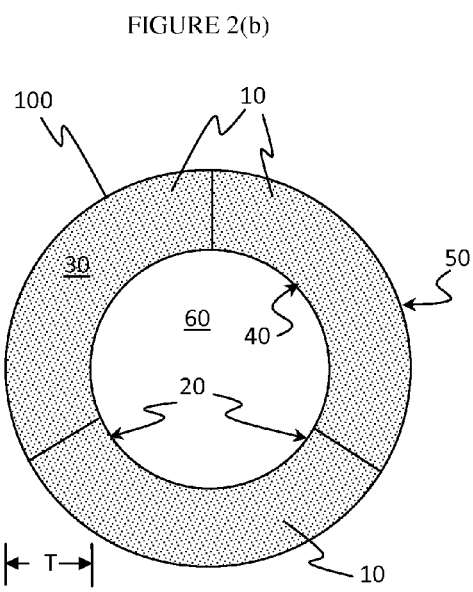
FIGURE 2(b)

THERMOPLASTIC POLYMERIC FOAM PIPE INSULATION

BACKGROUND OF THE INVENTION

Field of the Invention

The present invention relates to pipe insulation articles comprising thermoplastic polymer foam and a process for insulating a section of pipe with such an article.

INTRODUCTION

Effective 1 Jul. 2012, new standards took effect governing classifications of fire testing for building material in Europe. Prior to that date, classifications were determined by classifying the fire testing performance of individual components of a building structure. The new standards require testing of building systems containing all components together. This constitutes a paradigm shift in fire performance testing in Europe.

The new standard classifies fire test performance under EN13501-1. Classifications for linear pipe insulation fall into a range of $A1_L$-$F_L$. Classifications above $F_L$ correspond to increasing (improved) fire resistant performance as the classification approaches $A1_L$. A classification of $F_L$ corresponds to failing to achieve a Class E rating under EN ISO 11925-2 testing. A classification of $E_L$ corresponds to passing EN ISO 11925-2 testing, yet such a classification is still insufficient for many applications. In order to achieve a classification of $D_L$, $C_L$ or $B_L$, the pipe insulation must pass tests under both EN ISO 11925-2 and EN 13823.

Thermoplastic polymer foam-based insulation systems for vertically oriented linear pipes have struggled under the EN13501-1 classification rating. In particular thermoplastic polymer foam-based insulation systems have struggled to achieve a classification of $D_L$ or better, especially $C_L$ or better. Therefore, there is a need to develop an insulating system that is suitable insulating linear pipes, particularly vertically oriented pipes, that improves performance over current thermoplastic polymer foam-based pipe insulation under this new European fire test standard.

Historically, obtaining qualifications for building components has required incorporating extensive amounts of brominated flame retardant into a thermoplastic polymer. For example, it is common for a thermoplastic polymer foam for use in pipe insulation to contain 2.5 weight percent (wt %) bromine or more based on foam weight in order to pass previously required classifications such as the M1 classification in the French electric burner test. Halogens such as bromine have a generally unfavorable reputation, particularly among environmentalists. Regardless of whether the disfavor is reasonable, the unfavorable reputation makes it desirable to develop a thermoplastic polymer foam insulation for pipes that not only passes the new standard, but that requires less bromine than is currently required in thermoplastic polymer foam pipe insulation.

It is desirable to obtain a thermoplastic polymer foam pipe insulation that can achieve a $C_L$ and preferably a $B_L$ rating in the new EN13501-1 classification standards. It is even more desirable to obtain such a thermoplastic polymer foam pipe insulation that contains less than 2.5 wt % bromine, preferably 2.0 wt % or less bromine, even more preferably 1.8 wt % or less bromine with wt % bromine relative to total foam weight. It is yet more desirable to obtain an extruded thermoplastic polymer foam suitable as pipe insulation that can achieve a $C_L$ and preferably a $B_L$ rating in the new EN13501-1 classification standards and preferably that contains less than 2.5 wt % bromine, preferably 2.0 wt % or less bromine, even more preferably 1.8 wt % or less bromine (with wt % bromine relative to total foam weight) so the thermoplastic polymer foam can be made efficiently and continuously.

BRIEF SUMMARY OF THE INVENTION

The present invention provides a solution to the problem of providing thermoplastic polymer foam that can achieve a $C_L$ rating, preferably a $B_L$ rating, under the EN13501-1 classification standards. Moreover, the present invention provides such a solution that is further characterized by comprising less than 2.5 wt % bromine, preferably 2.0 wt % or less bromine, even more preferably 1.8 wt % or less bromine in the thermoplastic polymer foam with wt % bromine relative to total foam weight. Yet more, the present invention provides an extruded thermoplastic polymer foam that is suitable as pipe insulation that can achieve a $C_L$ and even a $B_L$ rating under the new EN13501-1 classification standards and that contains less than 2.5 wt % bromine, preferably 2.0 wt % or less bromine, even more preferably 1.8 wt % or less bromine.

Surprisingly, the inventors discovered that a thermoplastic polymeric foam having a density less than 38 kilograms per cubic meter and a value for the product of density (in kg/m$^3$) and average cell size (in millimeters) of less than 17 millimeters*kilograms per cubic meter is capable of achieving at least a $C_L$, and even a $B_L$, rating under the EN13501-1 classification standards, even when containing less than 2.5 wt % bromine, preferably 2.0 wt % or less bromine, even more preferably 1.8 wt % or less bromine in the thermoplastic polymer foam. Without being bound by theory, it is a hypothesis that thermoplastic polymer foam having such properties comprise sufficiently thin cell walls so as to allow rapid melting away of the foam without burning when exposed to extreme heat. As a result, the polymer of the foam insulation is less likely to burn because the polymer melts away from the heat source before it becomes hot enough to burn. The inventors have also discovered how to prepare such thermoplastic polymer foam as an extruded monolithic foam billet that can be cut into a suitable shape for use as pipe insulation.

The inventors have surprisingly discovered a solution to both the problem of identifying what properties are necessary in an extruded thermoplastic polymeric foam article suitable for cutting into thermoplastic polymer foam pipe insulation to render the pipe insulation capable of achieving a $C_L$ or, preferably, a $B_L$ rating in the EN13501-1 classification standards and to the problem of how to prepare such a foam.

In a first aspect, the present invention is an article comprising at least two thermoplastic polymer foam pieces where: (a) each of the thermoplastic polymer foam pieces has a concave surface; (b) the thermoplastic polymer foam pieces fit together to form a length of foam having a generally annular cross section with the concave surfaces adjoining to form an internal edge defining a hole within the generally annular cross section; and (c) each thermoplastic polymer foam piece is an extruded thermoplastic polymer foam having a density less than 36 kilograms per cubic meter, a density and average cell size such that the product of density and average cell size is less than 17 millimeters*kilogram per cubic meter, and a thermal conductivity of 35 milliwatts per meter*Kelvin or less.

In a second aspect, the present invention is a process comprising: (a) providing pieces of thermoplastic polymer foam as described in any of the previous Claims; and (b) assembling the pieces of thermoplastic polymer foam to form a length of foam having a generally annular cross section. Desirably, the process of the second aspect further comprises providing a section of pipe and wherein the pieces of thermoplastic polymer foam are assembled around the section of pipe so that the pieces of the thermoplastic polymer foam form a length of foam having a generally annular cross section through with the length of pipe extends.

The article and process of the present invention is useful for insulating pipe.

BRIEF DESCRIPTION OF THE DRAWINGS

FIG. 1 illustrates an end-on view of possible cross sections for thermoplastic foam pieces of the present invention.

FIGS. 2(a) and (b) illustrate end-on views of cross section of thermoplastic foam pieces of the present invention that are assembled to form a generally annular cross section.

DETAILED DESCRIPTION OF THE INVENTION

Figure 3:
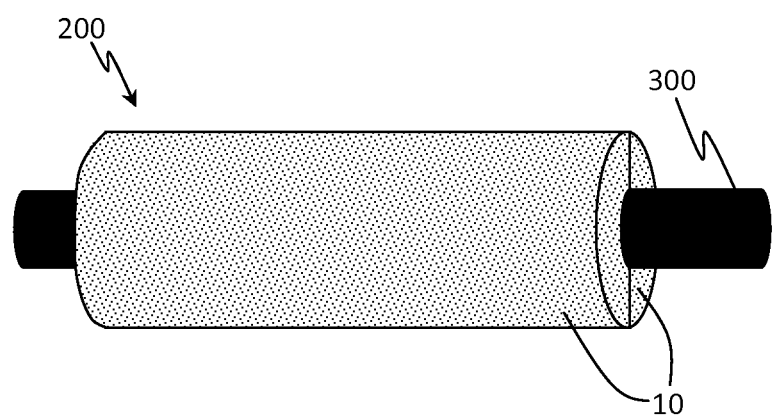
FIG. 3 illustrates an article of the present invention comprising thermoplastic foam pieces assembled around a length of pipe.

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International, formerly American Society for Testing and Materials; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated.

"Equivalent" means effectively interchangeable with; that is, having the same effect or value as and suitable for the same purpose. In its strictest sense, equivalent means identical to. In its fullest definition, equivalent accommodates non-identical values as long as the non-identical values are sufficiently proximate to the reference value so as to be effectively interchangeable with the reference value.

"Polymer", unless indicated otherwise, refers to both homopolymer and copolymer. Unless otherwise indicated, "copolymer" includes block copolymer, graft copolymer, alternating copolymer and random copolymer. A thermoplastic polymer is a polymer that becomes soft and pliable when heated, without a change in its intrinsic properties.

Polymeric foam has three mutually orthogonal dimensions: length (or extrusion), width (or horizontal) and thickness (or vertical). The length dimension is has a magnitude equal to the largest magnitude of the length, width and thickness. The thickness has a magnitude equal to the smallest magnitude of the length, width and thickness. The magnitude of the width can be equal to or smaller than the magnitude of the length and equal to or larger than the magnitude of the thickness. For extruded foam, the length dimension typically corresponds to the extrusion dimension.

The article of the present invention comprises at least two thermoplastic polymer foam pieces. A thermoplastic polymer foam comprises a continuous thermoplastic polymer matrix having multiple cells (or voids) defined therein. The thermoplastic polymer matrix can comprise polymers other than thermoplastic polymers as long as the matrix has a continuous phase of thermoplastic polymer. Desirably, the thermoplastic polymer matrix comprises 70 weight-percent (wt %) or more, preferably 80 wt % or more, more preferably 90 wt % or more and can comprise 95 wt % or more and even 100 wt % thermoplastic polymer based on total weight of polymer in the thermoplastic copolymer matrix.

Suitable thermoplastic polymer for use in the thermoplastic polymer matrix includes any one or any combination of more than one thermoplastic polymer. Thermoplastic polymers include olefinic polymers and aromatic polymers including copolymers of olefinic and aromatic monomers. Olefinic polymers include homopolymers and copolymers of monomers selected from ethylene, propylene, butene, pentene, hexene, heptene, octene and nonene. Aromatic polymers include polymers of alkenyl aromatic monomers such as styrene.

Desirably, the thermoplastic polymer of the thermoplastic polymer matrix is an aromatic polymer, preferably an alkenyl aromatic polymer. Styrenic polymers are particularly desirable alkenyl aromatic polymers and are polymers that have styrene monomer polymerized into the backbone of the thermoplastic polymer preferably at a concentration of more than 50 wt % of all the monomer units copolymerized into the thermoplastic polymer. The styrenic polymer can be a styrenic homopolymer or a styrenic copolymer. Examples of monomers that are desirable for copolymerizing with styrene to form the thermoplastic polymer include any one or combination or more than one of the following: acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

Styrene-acrylonitrile copolymer (SAN) is one desirable alkenyl-aromatic polymer for use as the thermoplastic polymer in the thermoplastic polymer matrix because of its ease of manufacture and monomer availability. SAN copolymer can be a block copolymer or a random copolymer, and can be linear or branched. SAN has higher heat distortion temperature than polystyrene homopolymer, which provides for foam having a higher use temperature than polystyrene homopolymer foam. Desirable embodiments of the present process employ polymer compositions that comprise, or even consist of SAN. The one or more alkenyl-aromatic polymer, even the polymer composition itself may comprise or consist of a polymer blend of SAN with another polymer such as polystyrene homopolymer.

The thermoplastic polymer foam pieces are desirably extruded thermoplastic polymer foam. Extruded thermoplastic polymer foam differs from expanded polymer foam by being free of skins that enclose groups of cells within the foam article. Expanded polymer foam is a product of expanding multiple foam beads in close proximity to one another and causing the expanded foam beads to fuse together. The resulting expanded polymer foam comprises multiple beads fused together with each bead defined by a skin surrounding the cells within a bead. Extruded thermoplastic polymer foam is free from skins that enclose groups of cells within the foam structure, which provides a meaningful advantage in properties and performance for the extruded thermoplastic polymer foam. The denser skin network of the expanded foam provides a pathway for thermal conductivity through the foam structure that inhibits thermal insulating properties. Expanded foam also tends to be more friable than extruded foam with structural weaknesses occurring at the fused skin interfaces. However, extruded thermoplastic polymer foam of sufficient dimensions for use as pipe insulation, particularly having the properties of the present invention, is difficult to prepare.

The thermoplastic polymer foam pieces of the present invention can be either open-celled or closed-celled. Open-celled foam has greater than 30 percent (%), preferably greater than 50%, more preferably 75% or more, still more preferably 90% or more and can have 100% open cell content. Closed-celled foam has less than 30%, preferably 20% or less, still more preferably 10% or less, yet more preferably 5% or less and can have zero % open cell content. Measure open cell content according to ASTM method D6226-05.

The thermoplastic polymeric foam pieces have a density less than 36 kilograms per cubic meter (kg/m$^3$), preferably 35 kg/m$^3$ or less, more preferably 34 kg/m$^3$ or less, yet more preferably 33 kg/m$^3$ or less. Determine density according to ASTM method D1622-08.

The thermoplastic polymer foam pieces also have an average cell size that is an average of width (horizontal), thickness (vertical) and length (extruded) cell size dimensions. Determine each of the cell size dimensions according to ASTM D3576. Desirably, the average cell size of each thermoplastic polymer foam piece is 0.5 millimeters (mm) or less, preferably 0.45 mm or less.

An important property of the polymeric foam pieces of the present invention is that the product of its average cell size (in mm) and the density is less than 17 millimeters*kilogram per cubic meter (mm*kg/m$^3$), preferably 16 mm*kg/m$^3$ or less, still more preferably 15 mm*kg/m$^3$ or less. Without being bound by theory, one hypothesis for the importance of these ranges of cell size times density is that they correspond to polymeric foam with a sufficiently thin cell wall so as to allow the thermoplastic polymeric foam to melt away from heat before getting hot enough to burn. It is one hypothesis that if the cell walls are too thick the foam will heat up and begin to burn before melting away from a source of heat. Surprisingly, these cell size times density values have been now discovered to allow thermoplastic foam pieces, when assembled into a pipe insulation configuration, to achieve a $C_L$ or even $B_L$ rating or better under the EN13501-1 standard.

Moreover, these ratings are achievable even when the polymeric foam pieces contain less bromine than is required to achieve flame acceptable flame retardant performance under other standard test such as the French MI (NF 92-507) test. It is common to require 2.4 wt % or more bromine based on polymer foam weight to pass the French M1 test. However, the thermoplastic polymer foam pieces can achieve a $C_L$ or even $B_L$ rating or better under the EN13501-1 standard with less than 2.4 wt %, even 2.0 wt % or less and even 1.8 wt % or less bromine based on thermoplastic polymer foam weight and even when the polymeric foam pieces are the sole components of the pipe insulation being evaluated under EN13501-1. Generally, the thermoplastic polymer foam pieces at the same time contain some bromine, typically one wt % or more and preferably 1.5 wt % or more based on total thermoplastic polymer foam weight.

It is desirable for the polymeric foam pieces to have a compressive balance in both of the thickness (vertical) to length (extrusion) dimensions and thickness (vertical) to width (horizontal) dimensions of 3.0 or less, preferably 2.7 or less, still more preferably 2.5 or less, and yet more preferably 2.0 or less while at the same time desirably being 0.5 or more, preferably 0.7 or more, still more preferably 0.9 or more. Determine compressive balance in the thickness to length dimensions by dividing the compressive strength in the thickness dimension by the compressive strength in the length dimension. Determine compressive balance in the thickness to width dimensions by dividing the compressive strength in the thickness dimension by the compressive strength in the width dimension. Measure compressive strength according to test method EN826. When determining compressive balance for extruded thermoplastic polymer foam the length dimension corresponds to the extrusion dimension while the thickness corresponds to what is commonly known as the vertical dimension and the width corresponds to what is commonly referred to as the horizontal dimension. Compressive balance is an indication of the uniformity of cell size dimensions. Foam with perfectly spherical cells will have a compressive balance in each dimension ratio of approximately one.

The thermoplastic polymer foam pieces each have a concave surface. The concave surface can be curved, angular or any shape. A "concave" surface is a surface that tracks on the foam side of a line drawn connecting two ends of the concave surface. Determination of a concave surface is desirably done when viewing a cross section of a thermoplastic polymer foam piece. For example, FIG. 1 illustrates two examples of a cross section of foam 10, each with concave surface 20 that tracks on the foam side of line AB connecting ends A and B of concave surface 20.

Desirably, the concave surface for each piece of thermoplastic polymer foam is an arc with a radius of curvature that is equivalent for each piece. The thermoplastic polymer foam pieces fit together to form a length of foam having a generally annular cross section with the concave surfaces forming an internal edge defining a hole within the generally annular cross section. "Generally annular" means having a ring-shape such that there is a material (that is, foam of the thermoplastic polymer foam pieces) forming a perimeter around an opening within that perimeter. The ring-shape can be of any shape including circular, oval or rectilinear. The perimeter has an internal edge and an external edge. The internal edge defines the internal opening. The internal edge can define one shape around the internal opening while the external edge defines another shape around the perimeter. For instance, the perimeter can have a circular opening defined with it by the internal edge while the external edges defines a square thereby constituting a perimeter having a square shape with a circular hole defined therein.

The thermoplastic polymer foam pieces desirably have a thickness of 25 millimeters (mm) or more, preferably 30 mm or more, and can be 40 mm or more, 50 mm or more, 60 mm or more and even 70 mm or more. Generally, the thickness of the thermoplastic polymer foam pieces is 75 mm or less. The thickness of the thermoplastic polymer foam piece is the shortest distance extending radially from the aforementioned concave surface to an opposing surface. The thickness corresponds to the shortest distance through the thermoplastic polymer foam piece from internal edge to external edge when assembled with the other thermoplastic polymer foam pieces into a length of foam having a generally annular cross section.

The external edge is opposing the internal edge. The thermoplastic polymer foam pieces fit together around a pipe with the pipe extending through the hole defined by the internal edge of the perimeter created by the assembled thermoplastic polymer foam pieces.

FIGS. 2(a) and 2(b) show cross sectional views of two articles of the present invention assembled in such a manner as to form a length of foam having a generally annular cross section. FIG. 2(a) illustrates article 100 comprising two thermoplastic polymer foam pieces 10 having concave surfaces 20 and thickness T. Thermoplastic polymer foam pieces 10 are assembled to form perimeter 30 having internal edge 40 and external edge 50. Concave surfaces 20 define internal edge 40. Perimeter 30 is a generally annular shape having circular opening 60 defined by internal edge 40. External edge 50 defines a square shape for perimeter 30. FIG. 2(b) is similar to FIG. 2(a) except it illustrates article 100 comprising three polymer foam pieces 10 and external edge 60 defines a circle shape.

The thermoplastic polymer foam pieces are desirably monolithic meaning each thermoplastic polymer foam piece is a single element as opposed to a laminate of multiple elements. For example monolithic extruded polymeric foam is a foam structure that is extruded as a single foam as opposed to comprising multiple foam pieces laminated together. In the present invention, the thermoplastic polymer foam pieces are desirably monolithic. Monolithic foam pieces are free from dense layer associated with interfaces between laminated foam pieces, dense layers that can undesirably act as thermal shorts through the insulating foam.

Desirably, the thermoplastic polymer foam pieces are both monolithic and have a thickness in the aforementioned ranges. It is further desirable that the thermoplastic polymer foam pieces are extruded foam. Monolithic thermoplastic polymer foam pieces of these thicknesses are particularly difficult to prepare because they need to be cut from a single block of extruded foam. Preparing a single block of foam having the density and cell size required for the thermoplastic polymer foam pieces and of sufficient block dimensions to allow for cutting out of pieces for pipe insulation articles is challenging.

The thermoplastic polymer foam pieces can comprise additives dispersed within the thermoplastic polymer matrix. Typical additives include any one or any combination of more than one of the following: flame retardant components (for example: brominated polymers, non-polymeric brominated compounds, phosphorous components, and chlorinated compounds), infrared attenuating agents (for example: graphite, carbon black, titanium dioxide, alumina boehmite, and metal flake), processing aids, colorants and pigments. However, it is desirably for the thermoplastic polymer foam to comprise 2.5 wt % or less, preferably 2.0 wt % or less and more preferably 1.8 wt % or less of bromine. Bromine is a common component of flame retardant additives and concentrations of bromine in polymeric foam typically exceeds 2.5 wt % in order to meet flame retardancy requirements. However, the present invention does not require such an extensive amount of bromine in order to achieve the desirable $C_L$ rating or better in EN13501-1 classification.

While the thermoplastic polymer foam pieces in the article of the present invention can have different properties within the scope of these teachings, it is desirable for each of the thermoplastic polymer foam pieces to have similar densities, average cell size and thermal conductivities. Ideally, each of the thermoplastic polymer foam pieces are extruded polymeric foam having equivalent densities, average cell size and thermal conductivity.

The article can further comprise a section of pipe positioned such that the pieces of thermoplastic polymer foam are assembled around the section of pipe so as to form a length of foam having a generally annular cross section with the pipe extending through the hole of the generally annular cross section. Typically, in such an article the pieces of thermoplastic polymer foam have a concave surface that is an arc of a certain radius of curvature and the section of pipe has an outside surface with a radius of curvature equal to or less than the radius of curvature for the concave surfaces of the pieces of thermoplastic polymer foam assembled around the pipe. See, for example, FIG. 3 which illustrates an embodiment of the article of the present invention comprising a pipe. Article 200 comprises two thermoplastic polymer foam pieces 10 that are assembled to form a length of foam having a generally annular cross section, similar to that of FIG. 2(b) except with only two thermoplastic polymer foam pieces, with pipe 300 extending through the hole defined in the cross section. Notably, while FIG. 3 illustrates portions of pipe 300 that extend without being covered by thermoplastic polymer foam pieces it is desirable for most if not all of pipe 300 to be covered with thermoplastic polymer foam pieces.

The article of the present invention can comprise or be free of components other than the thermoplastic polymer foam pieces, or the thermoplastic polymer foam pieces and section of pipe, as described herein. For example, the article can comprise or be free of polymeric foam other than the thermoplastic polymer foam pieces. The article can comprise or be free of coverings that go around the thermoplastic polymer foam pieces when they are assembled into a foam length having a generally annular cross section.

The present invention further comprises a process for assembling an article of the present invention. The process comprises providing a section of pipe, providing pieces of thermoplastic polymer foam as previously described, and assembling the pieces of thermoplastic polymer foam around the section of pipe so that the pieces of the thermoplastic polymer foam form a length of foam having a generally annular cross section through which the length of pipe extends. The resulting article is an insulated section of pipe.

Providing the thermoplastic polymer foam pieces can include manufacturing the thermoplastic foam pieces. Make the thermoplastic polymer foam pieces by any means known in the art. Preferably, prepare the thermoplastic polymer foam pieces by cutting them from a monolithic extruded foam billet. Desirably, the entire billet has the same density, thermal conductivity and average cell size as described for the thermoplastic polymer foam pieces.

Desirably, the thermoplastic polymer foam pieces are cut from a monolithic extruded polymer foam billet. Prepare a suitable monolithic extruded polymer foam billet by carefully controlling the amount of blowing agent, type of blowing agent and temperatures during expansion, as described in the examples below.

The thermoplastic polymeric foam pieces can be prepared in an absence of chlorinated hydrocarbons, chlorinated fluorocarbons and chlorinated hydrofluorocarbons and, as such, the resulting thermoplastic polymer foam pieces can be free of chlorinated hydrocarbons, chlorinated fluorocarbons and chlorinated hydrofluorocarbons.

EXAMPLES

Comparative Example A

Prepare extruded thermoplastic polymer foam billets and then cut thermoplastic polymer foam pieces from those billets for the following example and comparative example. Prepare the thermoplastic polymer foam billets using a polystyrene homopolymer characterized by having a weight average molecular weight (Mw) of 195,000 grams per mole and a polydispersity (Mw/Mn) of 2.5 (for example, STY- RON™ 680 brand polystyrene resin; STYRON is a trademark of Styron Europe GmbH).

In an extruder, melt blend the polystyrene homopolymer together with 0.23 wt % barium stearate, 0.18 wt % coper phthalocyanine blue concentrate (15%), 0.4 wt % DOWLEX™ brand polyethylene resin (DOWLEX is a trademark of The Dow Chemical Company), 0.05-0.2 wt % talc, 0.1 wt % tetrasodiumpyrophosphate, 3.75 wt % hexabromocyclododecane (HBCD) and 20-30 wt % of a recycle stream of the polymeric foam being made to form a molten polymer mixture, with wt % based on weight of polystyrene homopolymer. The total polymer feed rate is 1711 kilograms per hour into the extruder.

Inject into the molten polymer mixture 8.2 wt % of a blowing agent to form a foamable polymer mixture. The blowing agent consists of 0.6 wt % isobutane, 0.6 wt % carbon dioxide, 2.0 wt % ethanol, and 5.0 wt % 1,1,1,2-tetrafluoroethane. Wt % of the blowing agent and its components are relative to molten polymer mixture weight.

Cool the foamable polymer mixture to a foaming temperature of 114 degrees Celsius (° C.) and extrude through a rectangular foaming die at a rate of 1700-2000 kilograms per hour into atmospheric pressure (101 KiloPascals). The pressure drop through the die is 14.8 MegaPascals. The rectangular die has an opening with a width of 260 mm and a height of 4.8 mm. The die lip temperature is 55° C. The foamable polymer mixture expands between polytetrafluoroethylene coated parallel forming plates on either side of the thickness dimension upon exiting the die so as to form a polystyrene foam billet having a width of 600 mm and thickness of 200 mm.

Using a state of the art wire cutting device, cut the polystyrene foam billet into pieces of polystyrene foam that are 500 mm and 1000 mm long for burn testing and that, when assembled together, serve as cylindrical pipe shell segments having a generally annular cross section with a thickness of 50 mm and an inner diameter, diameter of a circular hole defined in the perimeter of the cross section, of 22 mm (Comparative Example A). Each polystyrene foam piece serves as one halve of a cylindrical pipe shell. Notably, the length of the pieces of polystyrene foam can be any length in practice since they are cut from an extruded billet that can be any length. The lengths of 500 mm and 1000 mm are for meeting the requirements of the burn testing.

Subject the polystyrene foam pieces, as assembled pipe shells, to burn testing according to EN13823 to determine Fire Growth Rate (FIGRA), Total Heat Release (THR600), Smoke Growth Rate (SMOGRA) and Total Smoke Production (TSP600). Characteristics of the polystyrene foam pieces and results of the burn testing are in Table 1.

Example 1

Prepare a polystyrene foam billet in like manner as in Comparative Example A, but the with following changes: (i) use only 2.5 wt % HBCD in the molten polymer blend; (ii) use 8.9 wt % of a blowing agent composition (0.6 wt % isobutane, 0.6 wt % carbon dioxide, 2.0 wt % ethanol, 5.4 wt % 1,1,1,2-tetrafluoroethane, and 0.3 wt % water) based on molten mixture weight; (iii) Use a feed rate of 1850 kilograms per hour instead of 1711 kilograms per hour; and (iv) use a die opening that is 270 mm wide and 3.5 mm high and a die lip temperature of 70° C. The resulting polystyrene foam billet has a width of 600 mm and a thickness of 160 mm.

As with Comparative Example A, cut the billet into polystyrene foam pieces as described for Example A. Subject the foam pieces, which when assembled into cylindrical pipe shell segments serve as Example 1, to the same burn testing as described for Comparative Example A. Characteristics of the polystyrene foam pieces and results of the burn testing are in Table 1.

TABLE 1

| Property | Comparative Example A | Example 1 |
| --- | --- | --- |
| Foam billet width (mm) | 600 | 600 |
| Foam billet thickness (mm) | 200 | 160 |
| Foam density (kg/m$^3$) | 38.0 | 32.8 |
| Thermal Conductivity (mW/m*K) | 30.4 | 30.1 |
| Cell size (mm, vertical) | 0.64 | 0.41 |
| Cell size (mm, horizontal) | 0.71 | 0.42 |
| Cell size (mm, extrusion) | 0.74 | 0.44 |
| Average Cell size (mm) | 0.70 | 0.42 |
| 90 Day Compressive Strength (kPa, vertical) | 249 | 283 |
| 90 Day Compressive Strength (kPa, horizontal) | 245 | 173 |
| 90 Day Compressive Strength (kPa, extrusion) | 227 | 172 |
| Compressive Balance V/E | 1.1 | 1.64 |
| Compressive Balance V/H | 1.0 | 1.65 |
| (Cell Size)*(Density) in mm*kg/m$^3$ | 26.5 | 13.9 |
| Bromine Content (wt % relative to foam weight) | 2.4 | 1.7 |
| Burn Properties per EN13823 | | |
| FIGRA 0.4 MJ (Watts per second, W/s) | 239 | 7.7 |
| THR600 (Mega Joules, MJ) | 17.3 | 1.0 |
| SMOGRA (square meters per second per second, m$^2$/s$^2$) | 188 | 3.2 |
| TSP600 (square meters, m$^2$) | 1412 | 48.9 |
| SBI Classification under EN13501-1 | $D_L$ s2 d0 | $B_L$ s1d0 |

The data surprisingly reveals that an article of the present invention (Example 1) achieves a $B_L$ rating under EN13501-1 classification even when containing only 1.7 wt % bromine, which is less bromine than Comparative Example A, a similar article made of foam having more bromine but that does not achieve a rating of $C_L$ or better under EN13501-1 classification.

The invention claimed is:
1. An article comprising at least two thermoplastic polymer foam pieces where:
   (a) each of the thermoplastic polymer foam pieces has a concave surface;
   (b) the thermoplastic polymer foam pieces fit together to form a length of foam having a generally annular cross section with the concave surfaces adjoining to form an internal edge defining a hole within the generally annular cross section; and
   (c) each thermoplastic polymer foam piece is an extruded thermoplastic polymer foam having a density less than 36 kilograms per cubic meter, a density and average cell size such that the product of density and average cell size is less than 17 millimeters*kilogram per cubic meter, and a thermal conductivity of 35 milliwatts per meter*Kelvin or less
wherein the article is free of coverings that go around the thermoplastic polymer foam pieces when they are assembled into a foam length having a generally annular cross section and wherein the article achieves a $C_L$ or $B_L$ rating in the EN13501-1 classification standards.

2. The article of claim 1, further characterized by each of the thermoplastic polymer foam pieces containing less than 2.5 weight percent bromine based on thermoplastic polymer foam weight.

3. The article of claim 1, further characterized by each of the thermoplastic polymer foam pieces being a monolithic piece of extruded thermoplastic polymer foam having equivalent densities, average cell size and thermal conductivity.

4. The article of claim 1, further characterized by each of the thermoplastic polymer foam pieces having a thickness dimension, which is the shortest length extending radially from its concave surface as identified in claim 1 to an opposing surface, that is 25 millimeters or more.

5. The article of claim 1, further characterized by each of the thermoplastic polymer foam pieces being free of chlorinated hydrocarbons, chlorinated fluorocarbons and chlorinated hydrofluorocarbons.

6. The article of claim 1, further characterized by each of the thermoplastic polymer foam pieces having an average cell size of 0.5 millimeters or less.

7. The article of claim 1, further characterized by each of the thermoplastic polymer foam pieces being an extruded thermoplastic polymer foam having a compressive balance in both the thickness to length directions and thickness to width directions in a range of 0.5 to 3.0.

8. The article of claim 1, further characterized by the each of the thermoplastic polymer foam pieces having a density of 34 kilograms per cubic meter or less.

9. The article of claim 1, further comprising a section of pipe positioned such that the thermoplastic polymer foam pieces are assembled around the section of pipe so as to form a length of foam have a generally annular cross section with the pipe extending through the hole of the generally annular cross section.

10. The article of claim 9, further characterized by being free of polymeric foam that is different from that of the pieces of polymeric foam characterized in any previous claim.

11. The article of claim 1, further characterized by the thermoplastic polymer foam pieces each being styrenic polymer foam.

12. A process comprising: (a) providing pieces of thermoplastic polymer foam as described in claim 1; and (b) assembling the pieces of thermoplastic polymer foam to form a length of foam having a generally annular cross section.

13. The process of claim 12, further comprising providing a section of pipe and wherein the pieces of thermoplastic polymer foam are assembled around the section of pipe so that the pieces of the thermoplastic polymer foam form a length of foam having a generally annular cross section through with the length of pipe extends.

14. The process of claim 12, further characterized by the step of providing pieces of thermoplastic polymer foam includes cutting pieces of thermoplastic polymer foam from a monolithic billet of extruded thermoplastic polymer foam having a density less than 36 kilograms per cubic meter, a density and average cell size such that the product of density and average cell size is less than 17 millimeters*kilogram per cubic meter, and a thermal conductivity of 35 milliwatts per meter*Kelvin or less.

* * * * *